(12) United States Patent
Anderson et al.

(10) Patent No.: US 7,716,086 B2
(45) Date of Patent: May 11, 2010

(54) ELECTRONIC RETAIL ORDER COMMUNICATION

(75) Inventors: Glen J. Anderson, Sioux City, IA (US);
Russell F. Mcknight, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 12/150,252

(22) Filed: Apr. 25, 2008

(65) Prior Publication Data

US 2008/0201239 A1    Aug. 21, 2008

Related U.S. Application Data

(62) Division of application No. 09/943,883, filed on Aug. 31, 2001, now abandoned.

(51) Int. Cl.
*G06Q 30/00* (2006.01)
(52) U.S. Cl. ....................................................... 705/26
(58) Field of Classification Search .................. 705/28, 705/26, 27, 35, 37; 707/10, 104.1; 709/203, 709/224
See application file for complete search history.

(56) References Cited

U.S. PATENT DOCUMENTS

| | | | |
|---|---|---|---|
| 5,886,991 A | | 3/1999 | Guarneri et al. |
| 5,966,697 A | | 10/1999 | Fergerson et al. |
| 5,968,110 A | * | 10/1999 | Westrope et al. ............... 705/27 |
| 5,987,435 A | * | 11/1999 | Weiss et al. ................ 705/36 R |
| 6,199,116 B1 | | 3/2001 | May et al. |
| 6,249,773 B1 | * | 6/2001 | Allard et al. ................... 705/26 |
| 6,253,202 B1 | * | 6/2001 | Gilmour ......................... 707/9 |
| 6,269,343 B1 | | 7/2001 | Pallakoff |
| 6,279,031 B1 | | 8/2001 | Kawasaki et al. |
| 6,341,270 B1 | | 1/2002 | Esposito et al. |
| 6,466,969 B1 | | 10/2002 | Bunney et al. |
| 6,513,015 B2 | | 1/2003 | Ogasawara |
| 6,539,386 B1 | * | 3/2003 | Athavale et al. ............... 707/10 |
| 6,584,451 B1 | | 6/2003 | Shoham et al. |
| 6,594,692 B1 | * | 7/2003 | Reisman ..................... 709/219 |
| 6,604,089 B1 | | 8/2003 | Van Horn et al. |
| 6,606,604 B1 | * | 8/2003 | Dutta ........................... 705/26 |
| 6,609,106 B1 | | 8/2003 | Robertson |
| 6,633,910 B1 | | 10/2003 | Rajan et al. |
| 6,701,303 B1 | | 3/2004 | Denn et al. |
| 6,701,345 B1 | * | 3/2004 | Carley et al. ................. 709/205 |
| 6,785,718 B2 | | 8/2004 | Hancock et al. |
| 6,832,120 B1 | | 12/2004 | Frank et al. |
| 6,847,938 B1 | | 1/2005 | Moore |
| 6,882,269 B2 | | 4/2005 | Moreno |
| 6,938,001 B2 | | 8/2005 | Kimmel, Jr. |
| 6,959,207 B2 | | 10/2005 | Keinonen et al. |
| 6,968,360 B1 | | 11/2005 | Morrow et al. |
| 7,069,234 B1 | * | 6/2006 | Cornelius et al. ............. 705/26 |

(Continued)

FOREIGN PATENT DOCUMENTS

EP        0820028 A2      1/1998

*Primary Examiner*—Andrew Joseph Rudy

(57) ABSTRACT

Multiple users are provided the ability to add or modify items in an open order created by an originating user on an electronic retail system. The originating user has the ability to verify and authorize a final purchase order that is submitted to the retail system. The originating user forwards an open order to other users, who are then allowed to add to the order, such as by adding items to a shopping cart. In a tandem browsing mode, other users are invited to observe the interaction of the originating user with an electronic retail system and modify an order for approval by the originating user.

14 Claims, 2 Drawing Sheets

U.S. PATENT DOCUMENTS

| | | | |
|---|---|---|---|
| 7,080,035 B1 * | 7/2006 | Williams et al. | 705/37 |
| 7,082,407 B1 | 7/2006 | Bezos et al. | |
| 7,107,226 B1 * | 9/2006 | Cassidy et al. | 705/26 |
| 7,107,240 B1 * | 9/2006 | Silverman et al. | 705/37 |
| 7,143,190 B2 * | 11/2006 | Christensen et al. | 709/246 |
| 7,165,045 B1 * | 1/2007 | Kim-E | 705/37 |
| 7,184,973 B2 * | 2/2007 | Monteleone et al. | 705/26 |
| 7,558,747 B2 * | 7/2009 | Javangula et al. | 705/26 |
| 7,610,239 B1 * | 10/2009 | Silverman et al. | 705/37 |
| 2003/0023512 A1 | 1/2003 | Festa et al. | |

* cited by examiner ured by the present invention. The following description
ELECTRONIC RETAIL ORDER COMMUNICATION

CROSS REFERENCE TO RELATED APPLICATION

This application is a divisional of application Ser. No. 09/943,883, filed Aug. 31, 2001, now abandoned, which is incorporated herein by reference in its entirety.

FIELD OF THE INVENTION

The present invention relates to electronic retail, and in particular to a communication mechanism for an electronic retail system.

BACKGROUND OF THE INVENTION

Electronic retail systems provide the ability for customers to place orders for goods over a network connection such as the Internet. If the customer desires to place more than one order, it is much less expensive to place all the orders at the same time. Shipping expenses are less costly if multiple items can be shipped together, rather than separately.

Individuals can also keep track of goods they, or other family members want to purchase prior to beginning a session with an electronic retailer. By purchasing only after several goods have been identified, shipping costs may be reduced. However, it can be difficult for the person making the purchase to know exactly what goods other people desire. It can also be difficult to contact family members or other groups of people to ensure that they were aware of the chance to order goods.

SUMMARY OF THE INVENTION

Multiple users are provided the ability to add or modify items in an open order created by an originating user on an electronic retail system. The originating user has the ability to verify and authorize a final purchase order that is submitted to the retail system.

In one embodiment, the originating user forwards an open order to other users, who are then allowed to add to the order, such as by adding items to a shopping cart. The other users are alternatively given authority to open an order and modify it. Instant messaging, chat, tandem browsing and other communication mechanisms are used to communicate with other users to inform them of the ability to modify an open order.

In further embodiments, an order is left open by the originating user for a selected time, and other users are invited to add to the order. The originating user is provided information identifying the other users, and the items that they have ordered, and is given the ability to selectively approve or disapprove of individual items prior to finalizing the order. Alternatively, the originating user indicates that the other users are trusted at the time the open order is made available to the other users. At the time that the order is scheduled to close, it is automatically placed, using payment and delivery information previously provided by the originating user. In yet a further embodiment, orders are split into sub orders having different delivery points.

In a tandem browsing mode, other users are invited to observe and participate in the interaction of the originating user with an electronic retail system. Instant messaging is used to communicate between users. Users identify individually desired features of a device such as a personal computer during the interaction, and the electronic retailer recommends a device that best meets the needs of all the users.

DETAILED DESCRIPTION OF THE INVENTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The invention is first described generally with respect to a block diagram showing components of a network, followed by a description of order flow implemented in software or a combination of hardware, software and firmware. Finally, a block diagram of a computer system representative of components of the network is discussed.

Figure 1:
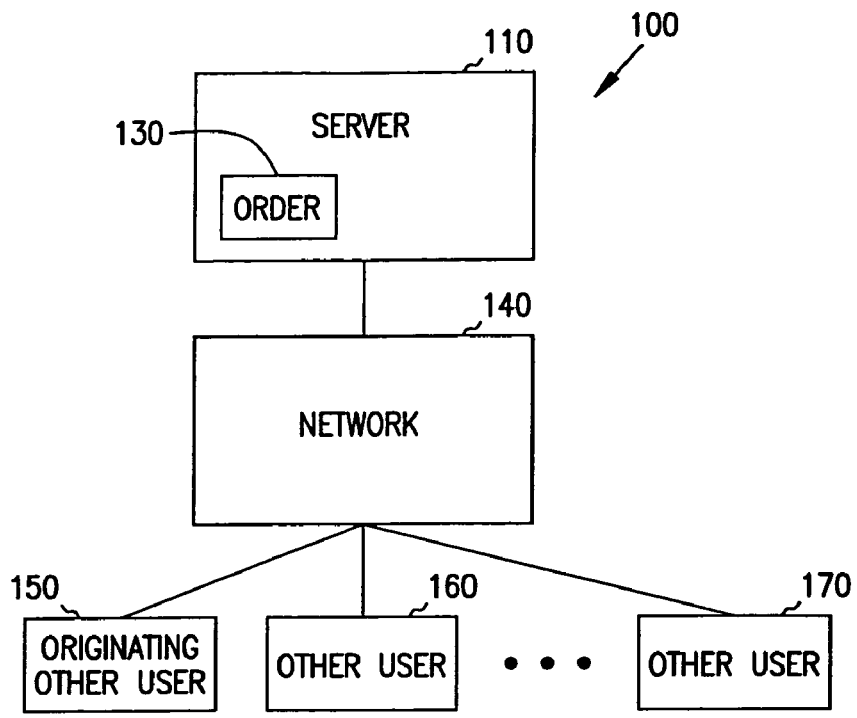
FIG. 1 is a block diagram of a network appliance, network and electronic retail system incorporating the present invention.

An electronic retail system is shown generally at 100 in FIG. 1. A server 110 hosts the retail system and provides catalogs of products which can be purchased. It also keeps track of orders 130, such as a shopping cart identifying products selected for purchase. A network 140 such as the Internet or other type of network providing for electronic communications provides a communication medium between an originating user network appliance 150, referred to as originating user 150, and the server 130. Communications commonly take the form of email, browsable pages of information, chat, instant messaging, file transfer and other forms of communication.

In one embodiment, an originating user initiates a shopping session with the server, and selects items for purchase. Such items are associated with an order 130, which is also referred to as an originating order. The originating user 150 then communicates information about the order to other users 160 and 170. There may be several other users, which are family members, coop members or other groups of users as desired. With the information about the originating order, the other users can add items to the order, creating a combined order. The combined order is communicated back to the originating user 150 for approval or the additional items on an item by item basis. Following such approval, the combined order is submitted to the electronic retail system.

The above and following functions are accomplished in many different ways in different embodiments. In one embodiment, other users are given information allowing them to directly access open orders on the server. Such users are given an ID, which identifies them as being another user for an open order, and a password to log into the order. All items that they add to the order are tagged with information identifying them as the adding user. In another embodiment, an order is formatted for use by other users, and sent to them electronically, either from the server, or from the originating user or another user in daisy-chain fashion. The other users then modify this formatted order by adding items. The originating user or server then receives the modified order and creates a combined order that includes orders from all the users. The originating user is then provided the ability to approve, modify and submit the order. This provides the originating user control over the order.

In a further embodiment, the originating user specifies a time period during which the order remains open for modification by the other users. The originating user is then provided the combined order for approval/modification/submission at the expiration of the time period. The time period is preset in one embodiment to a time each day, week or other time frame. In other words, the order closes at a set time each day, after which no modifications from other users may occur. Some time periods are set directly by the user for each open order, and some are predetermined by the server.

In yet a further embodiment, software on the originating user network appliance 150, or server 110 keeps a list of other users, and automatically notifies such other users when the originating user creates an open order, providing them the ability to modify the open order.

Figure 2:
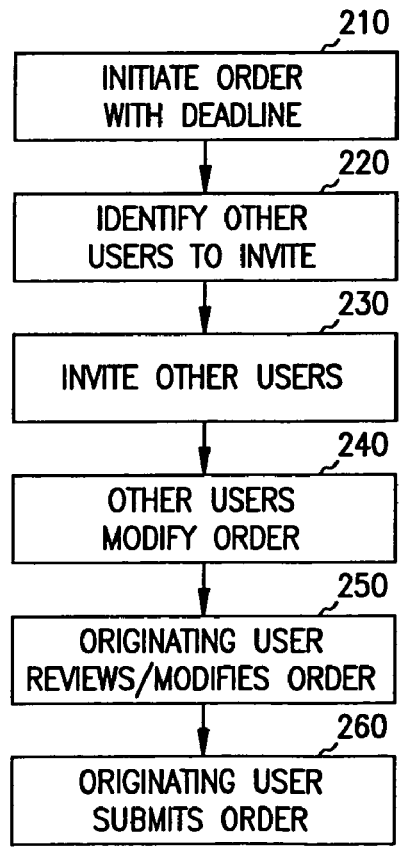
FIG. 2 is a flowchart of an order accumulator incorporated in one or more components of the system of FIG. 1.

FIG. 2 is a flow chart of the present invention. An originating user initiates an order with an electronic retail system at 210. Several alternatives are available for the originating user. Any type of network appliance is used to initiate the order, and items are added to an order, which is represented by a shopping basket in one embodiment. The items ordered are tagged in one embodiment with information uniquely identifying the initiating user. In other embodiments, no change in the identification of items is performed, and the originating user manually keeps track, or keeps track of the items on the network appliance. The initiating user also selects a deadline until which the order is kept open, also at 210. In further embodiments, the deadline is default time, or is set by the retail system.

At 220, other users are identified by the initiating user. Such other users are identified during the ordering process with the retail system, or are selected from an address list residing either on the network appliance, an Internet service provider, the retail system or are selected in another manner. In one embodiment, the other users are family members, or users residing proximate to each other such that a combined order shipped to a single point is easily distributed to the other users. The users are identified by the user of a name, or ID, and are optionally provided a password to access the order, or an email or network address by which to receive an indication or copy of the order.

At 230, several methods are available to invite the identified other users to add to the open order to create the combined order. In one embodiment, other users are each provided an ID and password, order number, and/or formatted copy of the order, which are communicated by one of many means, including electronic email, instant messaging, regular mail (well prior to opening an order) and orally in person or via telephone.

Sufficient information is provided to either allow the user to modify a copy of the order on their own network appliance or computer system, or to access the order on the electronic retail system and modify the order at 240. Each modification, usually an addition by selecting a further item, is optionally tagged with information to identify the other user selecting the item. The tag is a special code, or actual name or ID of the user. Depending on the form of the order modifications, information regarding the modifications is provided back to the originating user. If the other user directly modified the order on the retail system, the combined order is already in a form for review. Otherwise, the information is provided back to the originating user for communication back to the retail system.

At 250, the originating user reviews the order and may further modify the order by adding or deleting other items and deleting or adding items selected by other users. During the order process, in one embodiment, multiple delivery points are specified, with other users selecting the delivery points, or the originating user selecting the delivery points. Items are then associated with each delivery point. Accounting is also performed to allocate total costs to each of the users based on the total price of the order and the items ordered by each user. The open order is then submitted to the retail system for fulfillment at 260. In an alternative embodiment, the originating user may have the option to pay for some or all of the items.

Figure 3:
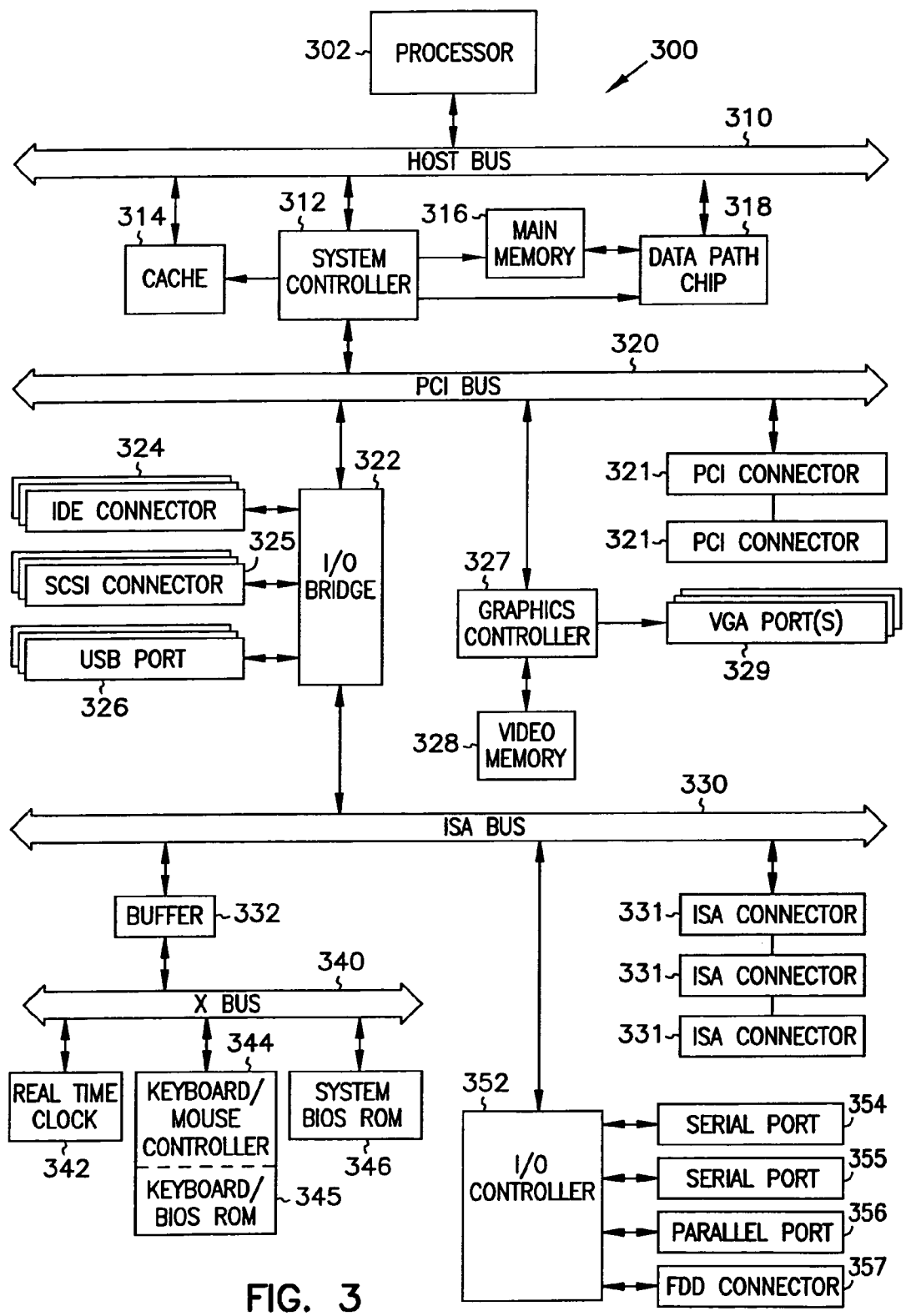
FIG. 3 is block diagram of a computer system for use as a network appliance or server.

FIG. 3 is a block diagram of a computer system 300 that facilitates a user interfacing with an electronic retail system via a network. The computer system is shown in more detail than is required for all implementations of a network appliance. In one embodiment, the computer system 300 is incorporated into a set top box for a television set. In further embodiments, computer system 300 comprises a handheld wireless device, a cellular telephone device or a combination thereof. Other embodiments may also be practiced which enable a user to connect to interact with and electronic retail system. Such embodiments implement internet browser software or other customized software allowing interaction with a retail system either directly or via a network. System 300 is also representative of an electronic retail system server. Functions of the invention are implemented in either a user system, the retail server, or a combination of both as desired. Software to provide the functions of the invention is stored on computer readable medium, including carrier waves, and executed on a processor.

As a personal computer system, computer system 300 comprises a processor 302, a system controller 312, a cache 314, and a data-path chip 318, each coupled to a host bus 310. Processor 302 is a microprocessor such as a 486-type chip, a Pentium®, Pentium® II, Pentium® III, Pentium® 4, or other suitable microprocessor. Cache 314 provides high-speed local-memory data (in one embodiment, for example, 512 kB of data) for processor 302, and is controlled by system controller 312, which loads cache 314 with data that is expected to be used soon after the data is placed in cache 312 (i.e., in the near future). Main memory 316 is coupled between system controller 314 and data-path chip 318, and in one embodiment, provides random-access memory of between 16 MB and 256 MB or more of data. In one embodiment, main memory 316 is provided on SIMMs (Single In-line Memory Modules), while in another embodiment, main memory 316 is provided on DIMMs (Dual In-line Memory Modules), each of which plugs into suitable sockets provided on a motherboard holding many of the other components shown in FIG. 3. Main memory 316 includes standard DRAM (Dynamic Random-Access Memory), EDO (Extended Data Out) DRAM, SDRAM (Synchronous DRAM), or other suitable memory technology. System controller 312 controls PCI (Peripheral Component Interconnect) bus 320, a local bus for system 300 that provides a high-speed data path between processor 302 and various peripheral devices, such as graphics devices, storage drives, network cabling, etc. Data-path chip 318 is also controlled by system controller 312 to assist in routing data between main memory 316, host bus 310, and PCI bus 320.

In one embodiment, PCI bus 320 provides a 32-bit-wide data path that runs at 33 MHz. In another embodiment, PCI bus 320 provides a 64-bit-wide data path that runs at 33 MHz.

In yet other embodiments, PCI bus 320 provides 32-bit-wide or 64-bit-wide data paths that run at higher speeds. In one embodiment, PCI bus 320 provides connectivity to I/O bridge 322, graphics controller 327, and one or more PCI connectors 321 (i.e., sockets into which a card edge may be inserted), each of which accepts a standard PCI card. In one embodiment, I/O bridge 322 and graphics controller 327 are each integrated on the motherboard along with system controller 312, in order to avoid a board-connector-board signal-crossing interface and thus provide better speed and reliability. In the embodiment shown, graphics controller 327 is coupled to a video memory 328 (that includes memory such as DRAM, EDO DRAM, SDRAM, or VRAM (Video Random-Access Memory)), and drives VGA (Video Graphics Adaptor) port 329. VGA port 329 can connect to industry-standard monitors such as VGA-type, SVGA (Super VGA)-type, XGA-type (extended Graphics Adaptor) or SXGA-type (Super XGA) display devices. Other input/output (I/O) cards having a PCI interface can be plugged into PCI connectors 321. Network connections providing video input are also represented by PCI connectors 321, and include Ethernet devices and cable modems for coupling to a high speed Ethernet network or cable network which is further coupled to the Internet.

In one embodiment, I/O bridge 322 is a chip that provides connection and control to one or more independent IDE or SCSI connectors 324-325, to a USB (Universal Serial Bus) port 326, and to ISA (Industry Standard Architecture) bus 330. In this embodiment, IDE connector 324 provides connectivity for up to two standard IDE-type devices such as hard disk drives, CDROM (Compact Disk-Read-Only Memory) drives, DVD (Digital Video Disk) drives, videocassette recorders, or TBU (Tape-Backup Unit) devices. In one similar embodiment, two IDE connectors 324 are provided, and each provide the EIDE (Enhanced IDE) architecture. In the embodiment shown, SCSI (Small Computer System Interface) connector 325 provides connectivity for up to seven or fifteen SCSI-type devices (depending on the version of SCSI supported by the embodiment). In one embodiment, I/O bridge 322 provides ISA bus 330 having one or more ISA connectors 331 (in one embodiment, three connectors are provided). In one embodiment, ISA bus 330 is coupled to I/O controller 352, which in turn provides connections to two serial ports 354 and 355, parallel port 356, and FDD (Floppy-Disk Drive) connector 357. At least one serial port is coupled to a modem for connection to a telephone system providing Internet access through an Internet service provider. In one embodiment, ISA bus 330 is connected to buffer 332, which is connected to X bus 340, which provides connections to real-time clock 342, keyboard/mouse controller 344 and keyboard BIOS ROM (Basic Input/Output System Read-Only Memory) 345, and to system BIOS ROM 346.

The integrated system performs several functions identified in the flowchart of FIG. 2. Such functions are implemented in software in one embodiment, where the software comprises computer executable instructions stored on computer readable media such as disk drives coupled to connectors 324 or 325, and executed from main memory 316 and cache 314. The term "computer readable medium" is also used to represent carrier waves on which the software is transmitted.

CONCLUSION

While several embodiments have been described, other configurations may also make use of the methods herein. The method of communicating orders to other users such as family members allows orders for the same family or group to be aggregated and shipped at the same time. This saves shipping charges in many situations, since some electronic retailers may even waive shipping charges for larger orders. By combining items for multiple members of a group in the same order, shipping charges are reduced when compared to shipping multiple items independently. A further advantage of some embodiments of the invention results from the ability to specify multiple shipping points. It allows larger groups to aggregate their orders, which can result in volume discounts.

What is claimed is:

1. A method of shopping on an electronic retail system, the method comprising:
    generating an order by selection of goods on a data entry device by an originating user on the electronic retail system via a network connection;
    communicating the order to another user by a notification system;
    receiving, by an accumulator, additions to the order from said another user; and
    providing the order, including additions to the order, to the originating user for submission as a combined order.

2. The method of claim 1 and further comprising facilitating modification or approval of the combined order by the originating user.

3. The method of claim 1 wherein the order is communicated to multiple other users.

4. The method of claim 3 wherein the order is communicated in serial or parallel manner.

5. The method of claim 1 wherein the order is communicated by identifying the order to said another user in a manner that permits the user to access the order.

6. The method of claim 1 wherein the order is communicated by facilitating a tandem browsing session of the order with the originating user and said another user.

7. The method of claim 1 wherein the order is communicated by at least one of electronic mail, chat, instant messaging and tandem browsing.

8. The method of claim 1 wherein the order is accessed by the users from the electronic retail system via a network.

9. The method of claim 1 wherein the order is formatted and sent to another user for modification and return to the originating user.

10. The method of claim 1 wherein modifications to an order by another user must be received within a predetermined tune to be included in the combined order.

11. The method of claim 10 wherein the predetermined time is selected by the originating user.

12. The method of claim 1 and further comprising submitting the combined order to the electronic retail system when it is approved by the originating user.

13. The method of claim 12, wherein the combined order specifies multiple shipping addresses.

14. The method of claim 12 and further comprising dividing a cost of the order between users based on what they ordered.

* * * * *